US008797328B2

(12) United States Patent
Corazza et al.

(10) Patent No.: US 8,797,328 B2
(45) Date of Patent: Aug. 5, 2014

(54) AUTOMATIC GENERATION OF 3D CHARACTER ANIMATION FROM 3D MESHES

(75) Inventors: Stefano Corazza, San Francisco, CA (US); Emiliano Gambaretto, San Francisco, CA (US)

(73) Assignee: Mixamo, Inc., San Francisco, CA (US)

( * ) Notice: Subject to any disclaimer, the term of this patent is extended or adjusted under 35 U.S.C. 154(b) by 186 days.

(21) Appl. No.: 13/038,185

(22) Filed: Mar. 1, 2011

(65) Prior Publication Data

US 2012/0019517 A1    Jan. 26, 2012

Related U.S. Application Data

(60) Provisional application No. 61/367,053, filed on Jul. 23, 2010.

(51) Int. Cl.
*G06T 13/00* (2011.01)
*G06T 17/00* (2006.01)
*G06T 13/40* (2011.01)

(52) U.S. Cl.
CPC .................................... *G06T 13/40* (2013.01)
USPC .......................................... 345/473; 345/420

(58) Field of Classification Search
CPC ......... G06T 13/40; G06T 13/00; G06T 17/00; G06T 13/20; G06T 17/205; G06T 2210/12
See application file for complete search history.

(56) References Cited

U.S. PATENT DOCUMENTS

| | | | |
|---|---|---|---|
| 6,047,078 A | 4/2000 | Kang | |
| 6,088,042 A * | 7/2000 | Handelman et al. | 345/473 |
| 6,278,466 B1 | 8/2001 | Chen | |
| 6,552,729 B1 | 4/2003 | Di Bernardo et al. | |
| 6,554,706 B2 | 4/2003 | Kim et al. | |

(Continued)

FOREIGN PATENT DOCUMENTS

| | | |
|---|---|---|
| EP | 1884896 A2 | 2/2008 |
| WO | 2007132451 A2 | 11/2007 |

(Continued)

OTHER PUBLICATIONS

Ju et al. Reusable Skinning Templates Using Cage-based Deformations, ACM Transactions on Graphics (TOG)—Proceedings of ACM SIGGRAPH Asia 2008, vol. 27 Issue 5, Dec. 2008.*

(Continued)

*Primary Examiner* — Carlos Perromat
(74) *Attorney, Agent, or Firm* — KPPB LLP

(57) ABSTRACT

Systems and methods for animating 3D characters using a non-rigged mesh or a group of non-rigged meshes that define the appearance of the character are illustrated. Certain embodiments disclose a process for the automatic rigging or autorigging of a non-rigged mesh or meshes. In one embodiment, a method of automatically rigging at least one mesh defining the external appearance of a 3D character includes creating a 3D representation of the external appearance of the 3D character defined by the at least one mesh, where the 3D representation is a single closed form mesh, identifying salient points of the 3D representation, fitting a reference skeleton to the 3D representation, calculating skinning weights for the 3D representation based upon the fitted skeleton, and automatically rigging the 3D character by transferring the skeleton and skinning weights generated with respect to the 3D representation to the at least one mesh defining the external appearance of the 3D character.

15 Claims, 9 Drawing Sheets

(56) References Cited

U.S. PATENT DOCUMENTS

| | | | |
|---|---|---|---|
| 6,700,586 B1 | 3/2004 | Demers | |
| 6,714,200 B1 | 3/2004 | Talnykin et al. | |
| 7,168,953 B1 | 1/2007 | Poggio et al. | |
| 7,209,139 B1 | 4/2007 | Keet et al. | |
| 7,522,165 B2 | 4/2009 | Weaver | |
| 7,937,253 B2 | 5/2011 | Anast et al. | |
| 2002/0050988 A1* | 5/2002 | Petrov et al. | 345/418 |
| 2003/0164829 A1 | 9/2003 | Bregler et al. | |
| 2003/0169907 A1 | 9/2003 | Edwards et al. | |
| 2003/0208116 A1 | 11/2003 | Liang et al. | |
| 2003/0215130 A1 | 11/2003 | Nakamura et al. | |
| 2004/0021660 A1 | 2/2004 | Ng-Thow-Hing et al. | |
| 2004/0049309 A1 | 3/2004 | Gardner et al. | |
| 2004/0227752 A1 | 11/2004 | McCartha et al. | |
| 2005/0264572 A1 | 12/2005 | Anast et al. | |
| 2006/0002631 A1 | 1/2006 | Fu et al. | |
| 2006/0109274 A1* | 5/2006 | Alvarez et al. | 345/473 |
| 2006/0134585 A1 | 6/2006 | Adamo-Villani et al. | |
| 2006/0171590 A1 | 8/2006 | Lu et al. | |
| 2006/0245618 A1 | 11/2006 | Boregowda et al. | |
| 2006/0267978 A1 | 11/2006 | Litke et al. | |
| 2007/0104351 A1 | 5/2007 | Yang et al. | |
| 2007/0182736 A1 | 8/2007 | Weaver | |
| 2008/0024487 A1* | 1/2008 | Isner et al. | 345/420 |
| 2008/0031512 A1 | 2/2008 | Mundermann et al. | |
| 2008/0043021 A1 | 2/2008 | Huang et al. | |
| 2008/0158224 A1 | 7/2008 | Wong et al. | |
| 2008/0170077 A1 | 7/2008 | Sullivan et al. | |
| 2008/0180448 A1 | 7/2008 | Anguelov et al. | |
| 2008/0252596 A1 | 10/2008 | Bell et al. | |
| 2009/0027337 A1 | 1/2009 | Hildreth | |
| 2009/0195544 A1 | 8/2009 | Wrinch | |
| 2009/0231347 A1 | 9/2009 | Omote | |
| 2010/0020073 A1 | 1/2010 | Corazza et al. | |
| 2010/0073361 A1 | 3/2010 | Taylor et al. | |
| 2010/0134490 A1 | 6/2010 | Corazza et al. | |
| 2010/0149179 A1 | 6/2010 | Aguiar et al. | |
| 2010/0259547 A1 | 10/2010 | De Aguiar et al. | |
| 2010/0278405 A1 | 11/2010 | Kakadiaris et al. | |
| 2010/0285877 A1 | 11/2010 | Corazza | |
| 2011/0292034 A1 | 12/2011 | Corazza et al. | |
| 2012/0038628 A1 | 2/2012 | Corazza et al. | |
| 2013/0021348 A1 | 1/2013 | Corazza et al. | |
| 2013/0127853 A1 | 5/2013 | Corazza et al. | |
| 2013/0215113 A1 | 8/2013 | Corazza et al. | |
| 2013/0235045 A1 | 9/2013 | Corazza et al. | |

FOREIGN PATENT DOCUMENTS

| | | |
|---|---|---|
| WO | 2009/007701 A1 | 1/2009 |
| WO | 2010/060113 A1 | 5/2010 |
| WO | 2010/129721 A2 | 11/2010 |
| WO | 2010/129721 A3 | 6/2011 |
| WO | 2011/123802 A1 | 10/2011 |
| WO | 2012012753 A1 | 1/2012 |

OTHER PUBLICATIONS

Baran et al. Automatic rigging and animation of 3D characters; ACM Transactions on Graphics (TOG)—Proceedings of ACM SIGGRAPH 2007, vol. 26 Issue 3, Jul. 2007.*
Di Bernardo et al., "Generating Realistic Human Motions from Observations", submitted to Fifth European Conf. on Computer Vision, ECCV 1998, pp. 1-12.
Goncalves et al., Reach Out and Touch Space (Motion Learning), Automatic Face and Gesture Recognition, 1998. Proceedings. Third IEEE International Conference on Apr. 14-16, 1998, pp. 234-239.
Taylor et al., "Modeling Human Motion Using Binary Latent Variables", Proc. of Advances in Neural Information Processing Systems (NIPS) 19, 8 pgs., 2006.
International Search Report for International Application PCT/US2011/045060, completed Nov. 27, 2011, 2 pgs.
Written Opinion for International Application PCT/US2011/0450600, completed Nov. 27, 2011, 5 pgs.
Anguelov et al., "The Correlated Correspondence Algorithm for Unsupervised Registration of Nonrigid Surfaces" Advance in Neural Information Processing Systems, 2005, 17, 33-40.
International Search Report for PCT/US2010/033797, filed May 5, 2010, report completed Jun. 11, 2010, 2 pgs.
Written Opinion for PCT/US2010/033797, filed May 5, 2010, completed Jun. 11, 2010, 4 pgs.
Beaudoin et al., "Adapting Wavelet Compression to Human Motion Capture Clips", GI '07 Proceedings of Graphics Interface, 2007, 6 pgs.
Blanz et al., "A Morphable Model for the Synthesis of 3D Faces", In Proceedings of ACM SIGGRAPH 1999, 8 pgs., 1999.
Tao et al., "Mean Value Coordinates for Closed Triangular Meshes", Proceedings of ACM SIGGRAPH (2005), 6 pgs.
International Search Report for International Application No. PCT/US 09/57155, date completed Dec. 22, 2009, date mailed Jan. 12, 2010, 5 pgs.
International Search Report for International Application No. PCT/US 09/65825, date completed Jan. 21, 2010, date mailed Jan. 28, 2010, 3 pgs.
Written Opinion of the International Searching Authority for International Application No. PCT/US 09/57155, date completed Dec. 22, 2009, date mailed Jan. 12, 2010, 6 pgs.
Written Opinion of the International Searching Authority for International Application No. PCT/US 09/65825, date completed Jan. 21, 2010, date mailed Jan. 28, 2010, 6 pgs.
Aguiar, E. DE et al., "Automatic Conversion of Mesh Animations into Skeleton-based Animations", EUROGRAPHICS 2008, Apr. 2008, 9 pgs.
Anguelov et al., "Recovering Articulated Object Models from 3D Range Data", In Proceedings of the 20th Conference on Uncertainty in Artificial Intelligence, pp. 18-26, 2004.
Anguelov et al., "SCAPE: Shape Completion and Animation of People", Proceedings of the SIGGRAPH Conference, 2005.
Anguelov et al., "The Correlated Correspondence Algorithm for Unsupervised Registration of Nonrigid Surfaces", In Conference on Computer Vision and Pattern Recognition (CVPR) pp. 77-84, 2004.
Cheung et al., "Shape-from Silhouette of Articulated Objects and its use for Human Body Kinematics Estimation and Motion Capture", In Conference on Computer Vision and Pattern Recognition (CVPR), pp. 77-84, 2003.
Curless AT AL., Allen, "The Space of Human Body Shapes: Reconstruction and Parameterization form Range Scans", ACM Transactions on Graphics, 22(3), pp. 587-594., 2003.
Curless et al., "A Volumetric Method of Building Complex Models from Range Images", Proceedings of SIGGRAPH 1996, pp. 302-312, 1996.
Curless et al., "A Volumetric Method of Building Complex Models from Range Images", Retrieved from http://graphics.stanford.edu/papers/volrange/volrange.pdf, pp. 1-10, 1996.
Curless et al., Allen, "Articulated Body Deformation from Range Scan Data", ACM Transactions on Graphics, 21(3), pp. 612-619, 2002.
Davis et al., "Filing Holes in Complex Surfaces Using Volumetric Diffusion", Symposium on 3 D Data Processing, Visualization, and Transmission, 2002.
De Aguiar et al., "Marker-Less 3D Feature Tracking for Mesh-Based Human Motion Caption", Human Motion 2007, LNCS 4818, 2007, 15 pgs.
Gao et al., "Motion normalization: the preprocess of motion data", 2005, pp. 253-256.
Garland et al., "Surface Simplification Using Quadric Error Metrics", Proceedings of SIGGRAPH 1997, pp. 209-216, 1997.
Hahnel et al., "An Extension of the ICP Algorithm for Modeling Nonrigid Objects with Mobile Robots", Proceedings of the International Joint Conference on Artificial Intelligence (IJCAI), 6 pgs., 2003.
Hilton et al., "From 3D Shape Capture to Animated Models", First International Symposium on 3D Processing, Visualization and Transmission (3DVPT2002), pp. 246-255, 2002.
Kahler et al., "Head shop: Generating Animated Head Models with Anatomical Structure.", ACM SIGGRAPH Symposium on Computer Animation, pp. 55-64, 2002.

(56) References Cited

OTHER PUBLICATIONS

Lewis, "H.264/MPEG-4 AVC CABAC overview", http://www.theonlineoasis.co.uk/notes.html, Dec. 3, 2012.

Lewis et al., "Pose Space Deformation: A Unified Approach to Shape Interpolation and Skeleton-Drive Deformation", Proceedings of ACM SIGGRAPH 2000, pp. 165-172, 2000.

Liepa, P., "Filing Holes in Meshes", Proc. of the Eurographics/ACM SIGGRAPH Symposium on Geometry Processing, pp. 200-205, 2003.

Ma et al., "An Invitation to 3D Vision", Springer Verlag, pp. 15-28, 2004.

Mamou et al., "Temporal DCT-based compression of 3D dynamic meshes", ICCOM'06 Proceedings of the 10th WSEAS international conference on Communications, 2006, pp. 74-79.

Mamou et al., "The New MPEG-4/FAMC Standard for Animated 3D Mesh Compression", IEEE 3DTV-CON'08, May 2008.

Max Planck Institut Informatik, "Automatic Conversion of Mesh Animations into Skeleton-based Animations", Retrieved at: http://www.mpiinf.mpg.de/-edeaguia/animation_eg08.html, Mar. 30, 2008, 9 pgs.

Mohr et al., "Building Efficient, Accurate Character Skins from Examples", ACM Transactions on Graphics, 22(3), 562-568, 2003.

Noh et al., "Expression Cloning", Proceedings of ACM SIGGRAPH 2001, pp. 277-288, 2001.

Okada, R et al., "A Video Motion Capture System for InteractiveGames.", MVA2007 IAPR Conference on MachineVisionApplications, Tokyo, Japan Retrieved from: http://scholar.google.comlscholar?hl=en&lr=&cItes=1827996963101226246&um=1&1e=UTF-8&sa=X&el=7SEVTJPblsGInQenipH-Cw&ved=OCDACzglwBA, Retrieved on Jun. 11, 2010, May 16-8, 2007.

Park et al., "On-line locomotion generation based on motion blending", ACM SIGGRAPH Symposium on Computer Animation. San Antonio, Jul. 21, 2002, pp. 105-111.

Park et al., "On-line motion blending for real-time locomotion generation", Computer Animation & Virtual Worlds Wiley, UK vol. 15, No. 3-4, Jul. 2004, pp. 125-138.

Popovic et al., "Style-Based Inverse Kinematics", ACM Transactions n Graphics, 23(3), pp. 522-531, 2004.

Safonova et al., "Construction and optimal search of interpolated motion graphs", ACM SIGGRAPH, 2007, 11 pgs.

Sand et al., "Continuous Capture of Skin Deformation", ACM Transactions on Graphics, 22(3), pp. 578-586, 2003.

Scholkopf et al., "A Tutorial on support Vector Regression", In Technical Report NC2-TR-1998-030. NeuroCOLT2, 1998.

Seo et al., "An Automatic Modeling of Human Bodies from Sizing Parameters", In Symposium on Interactive 3D Graphics, 19-26, 2003.

Sloan et al., "Shape by Example", In 2001 Symposium on Interactive 3D Graphics, pp. 135-144, 2001.

Smola et al., "A Tutorial on Support Vector Regression", Statistics and Computing London 14(3) pp. 199-222, 2004.

Sumner et al., "Deformation Transfer for Triangle Meshes", Proceedings of ACM SIGGRAPH 2004, 23(3), pp. 399-405, 2004.

Szliski et al., "Matching 3D Anatomical Surfaces with Non-rigid Deformations Using Octree-splines", International Journal of Computer Vision, 1996, 18(2), pp. 171-186, 1996.

Tung et al., "Topology Matching for 3D Video Compression Computer Vision and Pattern Recognition", IEEE Conference Computer Vision and Pattern Recognition, 2007, Jun. 2007.

Vasilescu et al., "Multilinear Analysis of Image Ensembles: Tensorfaces", European Conference on Computer Vision (ECCV), pp. 447-460, May 2002.

Vlasic et al., "Face Transfer with Multilinear Models", ACM Transactions on Graphics 24(3), pp. 426-433, 2005.

Vlasic et al., "Multilinear Models for Facial Synthesis", SIGGRAPH Research Sketch, 1 pg., 2004.

Von Luxburg, "A Tutorial on Spectral Clustering. Statistics and Computing", 2007, 32 pgs.

Wang et al., "Multi-weight Enveloping: Least Squares Approximation Techniques for Skin Animation", ACM SIGGRAPH Symposium on Computer Animation, pp. 129-138, 2002.

Zhidong et al., "Control of motion in character animation", Jul. 14, 2004, pp. 841-848.

Bray, "Markerless Based Human Motion Capture: A Survey", Published 2001, 44 pgs.

Buenaposada et al., "Performance Driven Facial Animation Using Illumination Independent Appearance-Based Tracking", IEEE 2006, 4 pgs.

Curio et al., "Semantic 3D Motion Retargeting for Facial Animation", ACM 2006, 8 pgs.

\* cited by examiner

AUTOMATIC GENERATION OF 3D CHARACTER ANIMATION FROM 3D MESHES

CROSS-REFERENCE TO RELATED APPLICATIONS

The current application claims priority to U.S. Application No. 61/367,053 filed Jul. 23, 2010 the disclosure of which is incorporated herein by reference.

FIELD OF THE INVENTION

The invention relates generally to the animation of 3D characters and more specifically to the rigging and animation of 3D characters.

BACKGROUND OF THE INVENTION

The generation of 3D content and in particular of 3D animated content is becoming more and more popular. Despite this trend, creating 3D characters that can be animated is still typically left to artists with specialized training.

Among the specialized skills of 3D artists or animators, the rigging of 3D characters is considered to be one of the most challenging. Rigging is usually a manual process. A 3D character is typically composed using one or more meshes, a skeleton and skinning weights. A mesh is typically a set of polygons defining the surface of an object, which often serves as the appearance of a 3D character. An object can be a character or any other discrete element in 3D visualization. A skeleton is generally a set of rigid items, or "bones", generally under the mesh of an object, analogous to anatomical bones. These skeleton bones are typically bonded to the mesh in order to provide motion to the 3D character model. Rigging is the process of creating a suitable skeleton for a character, binding the skeleton to the character mesh using skinning weights and defining forward kinematic parameters or inverse kinematic parameters that determine how the character moves. Forward kinematic and inverse kinematic animation are discussed further below. Rigging typically involves defining the relations governing the motion of the mesh polygons with respect to the underlying skeleton. Skinning weights are generally a set of weights defining the relations between the motion of the mesh polygons and the underlying skeleton bones. Rigging a 3D character often requires a robust solution that can not only model a static 3D character, but also a dynamic character where every movement of the skeleton brings a corresponding deformation to the polygon mesh. Essentially, the process involves manually placing skeleton bones and joints inside the character and specifying which parts of the character are attached to which bone.

Animation of a 3D character uses the skeleton and corresponding skinning weights associated with the character mesh. Animation is the motion applied to the character skeleton which drives the 3D character mesh that defines the appearance of a 3D character. The animation can be applied using forward or inverse kinematic animation. 3D characters are typically animated using synthetic motion data (i.e. motion data generated manually by an animator) or using actual motion data captured using a forward kinematic motion capture process. Retargeting can be used to adapt the motion data for one skeleton to animate another skeleton to accommodate variations in the number of bones and/or skeleton hierarchy and/or bone length. Retargeting of motion data generally involves characterization, which is the process of bringing the character to a reference pose and of mapping the joints of the character's skeleton to a predefined reference skeleton.

Two general animation techniques are forward kinematic (FK) and inverse kinematic (IK) animation. FK animation can animate a 3D character using motion data that specifies the joint angles of the skeleton of the 3D character, which in turn animates the at least one mesh that defines the appearance of the 3D character. IK animation refers to processes that animate a 3D character by posing the at least one mesh that defines the appearance of a 3D character and determining the joint angles of the 3D character's skeleton in the pose. In FK animation, the shape or pose of an object is calculated from the bones as well as the bend and rotation of each joint in the skeleton. For example in FK animation, the mesh that serves as the appearance of a 3D character is posed as calculated from the bones as well as the bend and rotation of each joint in the skeleton. In IK animation, the shape or pose of an object is used to calculate the bones as well as the bend and rotation of each joint in the skeleton. For example in IK animation, the mesh that serves as the appearance of a 3D character is posed and then the bones as well as the bend and rotation of each joint in the skeleton is calculated. Generally, IK animation requires different and more complicated calculations than FK animation as the mesh is not fixed due to the mesh deforming as the joints are bent and rotated.

SUMMARY OF THE INVENTION

Embodiments of the invention enable animation of 3D characters using a non-rigged mesh or a group of non-rigged meshes that define the appearance of the character. A number of embodiments include systems and methods for automatic rigging of a non-rigged mesh or meshes.

In one embodiment, a method of automatically rigging at least one mesh defining the external appearance of a 3D character includes creating a 3D representation of the external appearance of the 3D character defined by the at least one mesh, where the 3D representation is a single closed form mesh, identifying salient points of the 3D representation; fitting a reference skeleton to the 3D representation, calculating skinning weights for the 3D representation based upon the fitted skeleton, and automatically rigging the 3D character by transferring the skeleton and skinning weights generated with respect to the 3D representation to the at least one mesh defining the external appearance of the 3D character.

In a further embodiment, creating a 3D representation of the external appearance of the 3D character defined by the at least one mesh comprises budding the 3D representation from a plurality of 2D silhouettes of the at least one mesh taken from different viewpoints.

In another embodiment, creating a 3D representation of the external appearance of the 3D character defined by the at least one mesh comprises budding the 3D representation using ray targeting.

In an additional embodiment, identifying salient points of the 3D representation is performed using at least one technique selected from the group of: volumetric axis; Laplacian eigenmaps; isomaps; medial surface line; fitting the centroids of a set of spheres fitted inside the mesh; volumetric matching; voxel reduction; and voxel erosion.

In an again further embodiment, identifying salient points of the 3D representation is performed utilizing a training dataset.

In an again other embodiment, identifying salient points of the 3D representation includes identifying salient points of the 3D representation using Principle Component Analysis of the training dataset.

In an again additional embodiment, identifying salient points of the 3D representation is performed manually.

In a still further embodiment, fitting a reference skeleton to the 3D representation utilizes the identified salient points.

In a still other embodiment, fitting a reference skeleton to the 3D representation comprises fitting the centroids of a set of spheres inside the 3D representation to a graph.

In a still additional embodiment, calculating skinning weights for the 3D representation based upon the fitted skeleton involves using skinning templates specific to each joint.

In a yet further embodiment, a method of animating a 3D character includes: automatically rigging at least one mesh defining the external appearance of a 3D character, where automatically rigging the at least one mesh comprises fitting a skeleton to the at least one mesh and defining skinning weights for the at least one mesh based upon the fitted skeleton, characterizing the fitted skeleton with respect to a reference skeleton, retargeting motion data defined with respect to the reference skeleton to the fitted skeleton of the 3D character; and animating the 3D character by driving the at least one mesh in accordance with the fitted skeleton, the skinning weights, and the retargeted motion data.

In a yet another embodiment, automatically rigging at least one mesh defining the external appearance of a 3D character further includes creating a 3D representation of the external appearance of the 3D character defined by the at least one mesh, where the 3D representation is a single closed form mesh, identifying salient points of the 3D representation, fitting a reference skeleton to the 3D representation, calculating skinning weights for the 3D representation based upon the fitted skeleton, and transferring the skeleton and skinning weights to the at least one mesh defining the external appearance of the 3D character.

In a yet additional embodiment, the motion data that is retargeted is actual motion data.

A yet additional other embodiment includes generating synthetic motion data with respect to the reference skeleton based upon a high level description of a motion. In addition, the motion data defined with respect to the reference skeleton to the fitted skeleton that is retargeted to the 3D character is the synthetic motion data.

A yet again further embodiment includes a server configured to receive at least one mesh defining the external appearance of a 3D character and a high level description of a motion. In addition, the server is further configured to automatically rig the at least one mesh by fitting a reference skeleton to the at least one mesh and defining skinning weights for the at least one mesh based upon the fitted skeleton. Furthermore, the server is further configured to generate synthetic motion data for the reference skeleton based upon the high level description of the motion. Additionally, the server is further configured to retarget the synthetic motion data to the skeleton of the 3D character.

In a yet again another embodiment, the server is configured to create a 3D representation of the external appearance of the 3D character defined by the at least one mesh, where the 3D representation is a single closed form mesh. In addition, the server is configured to identify salient points of the 3D representation. Furthermore, the server is configured to fit a reference skeleton to the 3D representation. Additionally, the server is configured to calculate skinning weights for the 3D representation based upon the fitted skeleton. Moreover, the server is configured to automatically rig the 3D character by transferring the skeleton and skinning weights to the at least one mesh defining the external appearance of the 3D character.

In a yet again additional embodiment, a method of animating a 3D character, includes automatically rigging at least one mesh defining the external appearance of a 3D character, where automatically rigging the at least one mesh includes, creating a 3D representation of the external appearance of the 3D character defined by the at least one mesh, where the 3D representation is a single closed form mesh, identifying salient points of the 3D representation, fitting a reference skeleton to the 3D representation, calculating skinning weights for the 3D representation based upon the fitted skeleton, and transferring the skeleton and skinning weights to the at least one mesh defining the external appearance of the 3D character, characterizing the fitted skeleton with respect to a reference skeleton; generating synthetic motion data with respect to the reference skeleton based upon a high level description of a motion; retargeting the synthetic motion data defined with respect to the reference skeleton to the fitted skeleton of the 3D character, and animating the 3D character by driving the at least one mesh in accordance with the fitted skeleton, the skinning weights, and the retargeted motion data.

DETAILED DISCLOSURE OF THE INVENTION

Figure 1:
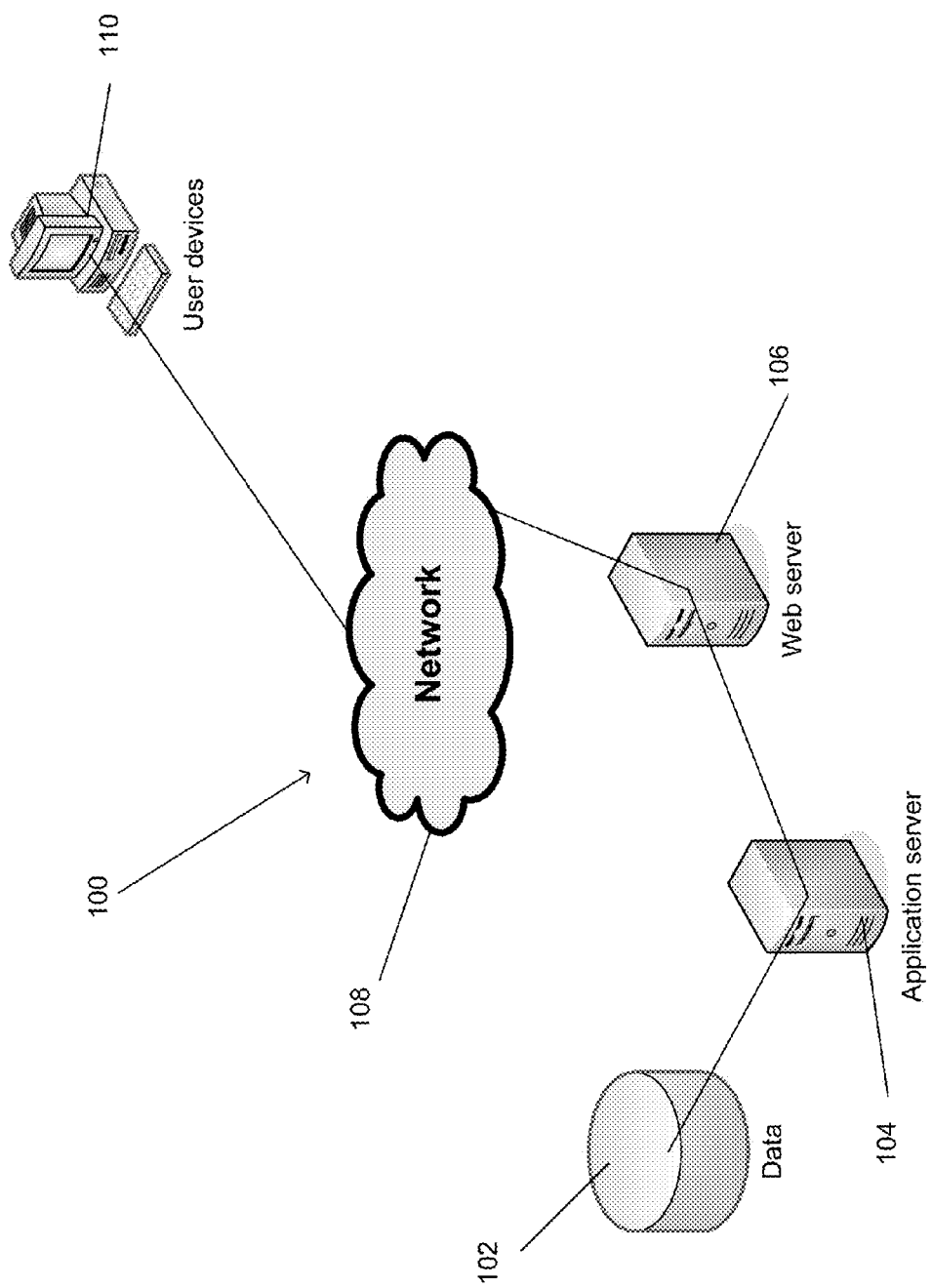
FIG. 1 is a network diagram illustrating a system configured to animate a non-rigged 3D character mesh defining the appearance of a 3D character in accordance with an embodiment of the invention.

Turning now to the drawings, systems and methods for animating 3D characters using a non-rigged mesh or a group of non-rigged meshes that define the appearance of the character are illustrated. Certain embodiments disclose a process for the automatic rigging or autorigging of a non-rigged mesh or meshes. For the purpose of discussing autorigging processes in accordance with embodiments of the invention, the term non-rigged mesh is used to refer to both a single non-rigged mesh defining the appearance of a character and multiple non-rigged meshes that define the appearance of a character. Once the mesh is rigged to complete the creation of a 3D character, processes in accordance with embodiments of the invention can also be utilized to automatically animate the 3D character using motion data that is retargeted to the skeleton of the 3D character. In many embodiments, the motion data is synthetic motion data that is automatically generated from a database of motions and is based upon a description of a desired motion sequence. However, any motion data may be utilized. Various embodiments require no database to generate motion data, such as generating motion data entirely from user input or through statistical models. In other embodiments, actual motion data acquired using a motion capture process is retargeted. In several embodiments, user input such as control of parameters may be used at certain junctures in rigging and/or animating. In various embodiments, delivery of content associated with rigging and/or animation of non-rigged 3D meshes occurs over the Internet. In numerous embodiments, delivery of content occurs offline and/or over a network.

In many embodiments, a process of receiving a non-rigged mesh, autorigging, characterization, retargeting and animation is disclosed. In many embodiments, the autorigging process involves creating a 3D representation from the provided mesh(es), identifying salient points, identifying a skeleton, calculating optimal skinning weights and transferring the skeleton and skinning weights to perform a forward kinematic rigging of the provided mesh(es). Numerous embodiments disclose characterization and retargeting as posing characters in a reference pose, mapping the joints of the autorigged 3D character to a reference skeleton and retargeting synthetic motion data to animate the skeleton of the autorigged 3D character.

In several embodiments, the forward kinematic (FK) 3D character model is used to generate an Inverse Kinematic (IK) rigged 3D character model for use in the IK animation of the 3D character. Particular embodiments use FK animation techniques to animate at least one mesh that defines the appearance of a 3D character. Various embodiments use IK animation techniques to animate at least one mesh that defines the appearance of a 3D character. A number of embodiments use both FK and IK animation techniques to animate at least one mesh that defines the appearance of a 3D character.

Numerous embodiments disclose robustly handling non-rigged meshes with multiple non-interconnected meshes, non-manifold entities, holes, or different levels of detail among multiple meshes. A number of embodiments disclose handling "pose invariant" meshes, or meshes without preference for a certain initial pose. Several embodiments are capable of handling meshes without limitation to shapes, sizes or features. Systems and methods for autorigging and animating a mesh or multiple non-interconnected meshes are discussed further below.

Network Diagram

FIG. 1 is a network diagram illustrating a system configured to animate a non-rigged mesh that defines the appearance of a 3D character in accordance with an embodiment of the invention. The animation system 100 includes a storage device 102 connected to a server system, which in the illustrated embodiment includes an application server 104 and a web server 106. The web server 106 is connected to the Internet 108 and a number of user devices 110 can access the web server 106 via the Internet using a browser application.

In many embodiments, the storage device 102 contains a database of motion data which can be used to animate 3D characters, including but not limited to using processes such as characterization and retargeting. The motion data may be used to generate synthetic motion data in certain embodiments. The servers provide a means by which user devices 110 can access the web server 106 via the Internet. The user devices can be any Internet connected device, such as a computer, that users can use to access a database in order to generate motion data. In several embodiments, the motion data generated is synthetic motion data for animating a 3D character. However, various embodiments may utilize any motion data defined relative to a reference skeleton. For example, a user device can provide a description via the web server that is used to generate synthetic motion data that is retargeted to the skeleton of the 3D character. This generated synthetic motion data can then be used on the user device to animate the 3D character. Processing a database may be done locally on the user devices or may be from other devices, such as a processor, with access to both the user device and the data.

Thereby, in the illustrated embodiment, 3D characters are animated locally on the user devices with access to motion data in storage to generate synthetic motion data.

In numerous embodiments, the database for generating motion data is not necessarily limited to availability over the Internet, but can be stored over any other network or even locally. A variety of embodiments also provide for processes, such as rigging, characterization, retargeting and animation to occur over a network and not locally. For example, a user device may utilize a processor to animate a non-rigged mesh. The processor may be able to perform the steps involved in animating a non-rigged mesh such as rigging, characterization, retargeting and animation. The processor or user device may access the database to generate synthetic motion data to animate a 3D character. The processor may be located in the user device or be available to the user device over a network, for example over the Internet. Thereby, the user device would only have access to a final animated character without undergoing any of the processing to create the final animated character.

In particular embodiments, a database may be composed of actual motion data, synthetic motion data or any other type of motion data. In a variety of embodiments, motion data for animating a 3D character is generated from the motion data in a database. For example, synthetic motion data for animating a 3D character may be generated from actual motion data in a database. Similarly, the generation of motion data may come from statistically modeling actual motion. Likewise, motion data may be generated from a database of synthetic motion data.

In multiple embodiments, generation of motion data does not involve a database of motion data. For example in particular embodiments, motion data can be generated manually by a user or by using statistical modeling or any other means of generating data that does not involve the utilization of actual motion data. Techniques for generating motion data are disclosed in U.S. Provisional. Patent Application No. 61/192, 779, as well as U.S. patent application Ser. No. 12/370,269, and U.S. patent application Ser. No. 12/753,032. The disclosure of U.S. Provisional Patent Application No. 61/192,779, U.S. patent application Ser. No. 12/370,269, and U.S. patent application Ser. No. 12/753,032 is incorporated by reference herein in its entirety.

Character Animation

Figure 2:
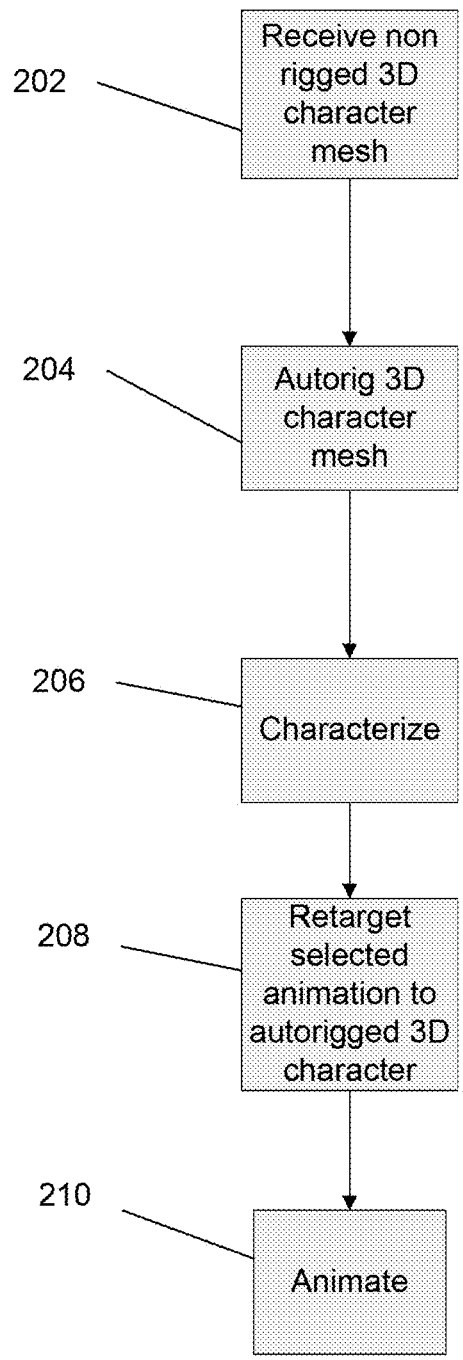
FIG. 2 is a flow chart illustrating a process of animating a character from a non-rigged 3D character mesh that defines the appearance of a 3D character in accordance with an embodiment of the invention.

FIG. 2 is a flow chart illustrating a process of animating a character from a non-rigged 3D character mesh that defines the appearance of a 3D character in accordance with an embodiment of the invention. The process begins when a non-rigged 3D character mesh is received (202) that defines the appearance of a 3D character. The non-rigged 3D character mesh is then automatically rigged (autorigged) (204). The autorigged 3D character mesh is then characterized (206). After characterization, the process retargets (208) motion data for the 3D character. Then, the 3D character is animated (210).

In many embodiments, a user provides (202) a non-rigged mesh or group of non-rigged meshes that define the appearance of a 3D character. This character mesh may be taken from an existing 3D character with existing mesh, skeleton and skinning weights. In several embodiments, this non-rigged mesh that defines the appearance of a 3D character does not need to be of a certain pose, or is pose invariant. However, the process may later automatically pose the character before retargeting (208) and animation (210). Autorigging (204) of a mesh is generally a process where the skeleton and the skinning weights of a FK 3D character model are determined. Characterization (206) occurs to bring the rigged 3D character model to a reference pose, from which the joints of the 3D character can be mapped to a reference skeleton, for which motion data is defined. Retargeting (208) takes a selected animation and retargets the motion data to the autorigged 3D character. Animation (210) can then occur by driving the skeleton of the 3D character using the retargeted (208) motion data. In many embodiments, the motion data is synthetic motion data that has been generated using a high level description of the desired motion and then retargeted (208) to the character. In several embodiments, the motion data is actual motion data that has been retargeted (208) to the character.

During retargeting (208), selected motion data is modified to drive a 3D character model. As noted above, retargeting can be used to adapt the motion data for one skeleton to animate another skeleton to accommodate variations in the number of bones and/or skeleton hierarchy and/or bone length. The retargeting process can be achieved through methods such as inverse kinematics (IK) driven matching or iterative closest point optimizations run on the skeleton joints. When IK driven matching is used during retargeting, the FK rigged 3D character can be used to generate a corresponding IK rigged 3D character. The retargeting process can then use the IK model to retarget motion data to the autorigged 3D character.

In the illustrated embodiment, a non-rigged mesh can be processed and animated (210) automatically or with minimal user input. User input may be used to accommodate user preferences during the process of animating the non-rigged mesh. For example, certain animations may be selected over others. Also, user input may be used on any other step of the process including, but not limited to, defining user preferences during the autorigging of the non-rigged mesh defining the appearance of a 3D character.

Autorigging

Figure 3:
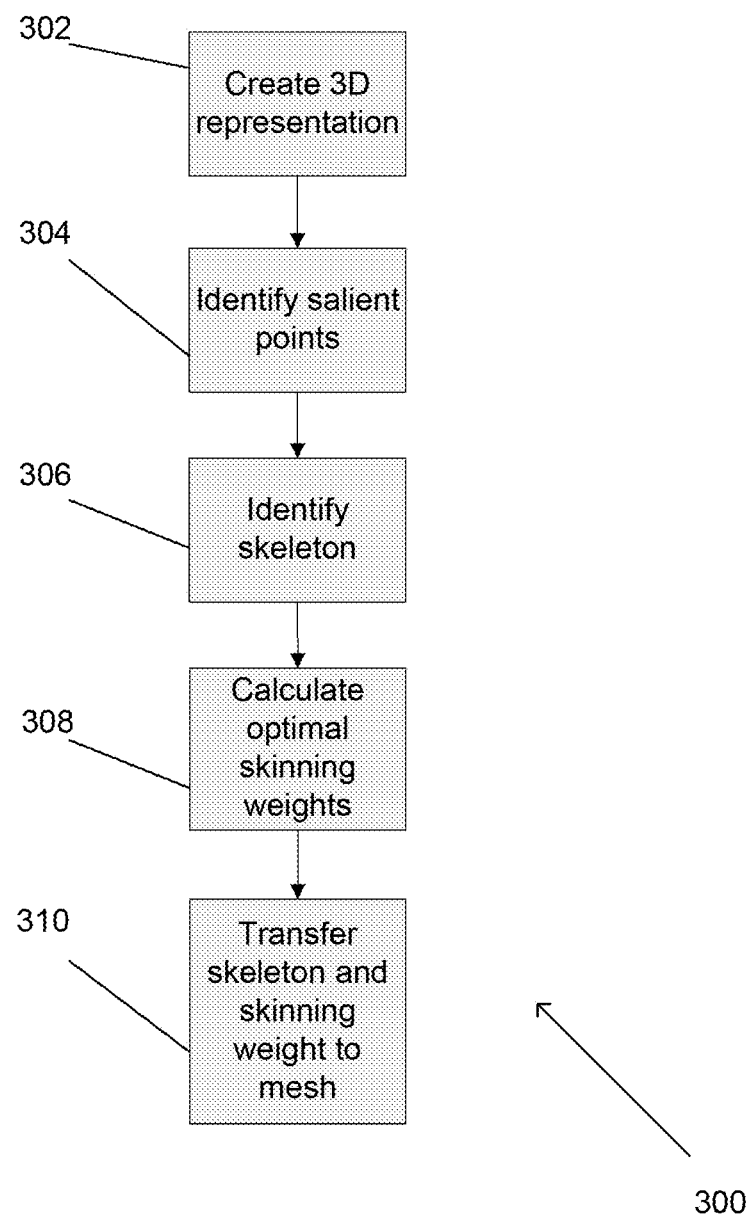
FIG. 3 is a flow chart illustrating a process for automatically rigging (autorigging) a non-rigged 3D character mesh that defines the appearance of a 3D character in accordance with an embodiment of the invention.

FIG. 3 is a flow chart illustrating a process 300 for automatically rigging (autorigging) a non-rigged mesh or group of meshes defining the appearance of a 3D character in accordance with an embodiment of the invention. The process 300 begins by creating (302) a 3D representation of the non-rigged 3D character mesh or meshes that define the appearance of a 3D character. After the 3D representation is created (302), salient points are identified (304). After salient points are identified (304), a skeleton is identified (306). After the skeleton is identified (306), optimum skinning weights are calculated (308). Following the calculation (308) of optimal skinning weights, the skeleton and skinning weights are transferred (310) to the previously non-rigged 3D character mesh or meshes that define the appearance of the 3D character to create an automatically rigged 3D character mesh.

In many embodiments, the 3D representation is created (302) by applying the Visual. Hull Technique, the Ray Targeting technique or any other technique that creates a single closed form mesh from a non-rigged mesh. A single closed form mesh is a mesh without any holes, whereby the mesh can be fully represented as an enclosed object. Aspects of the Visual. Hull Technique are described in A. Laurentini, *The Visual. Hull Concept for Silhouette-Based Image Understanding*, IEEE Transactions on Pattern Analysis and Machine Intelligence, vol. 16, no. 2, pp. 150-162, February 1994, the disclosure of which is incorporated herein by reference in its entirety. A visual hull is generally a geometric entity created by recreating a 3D shape from silhouettes. In general, the Visual. Hull Technique assumes the foreground object in an image can be separated from the background. Under this assumption, the original image can be processed as a foreground/background binary image, or silhouette image. The foreground mask, known as a silhouette, is the 2D projection of the corresponding 3D foreground object. Along with relevant viewing parameters, the silhouette defines a back-projected generated cone that contains the actual object. This cone is called a silhouette cone. The intersection of at least two cones is called a visual hull, which is a bounding geometry of the actual. 3D object. In various embodiments of the invention, the visual hull of an object is the envelope of all possible circumscribed cones. In many embodiments, the Visual. Hull Technique is applied to the unrigged mesh or group of meshes that define the appearance of a 3D character and the resulting bounding geometry, which is a single closed form mesh, is used as a 3D representation of the 3D character.

In other embodiments, a 3D representation of a mesh or group of meshes that define the appearance of a 3D character is created by applying the Ray Targeting Technique. Ray Targeting typically involves projecting rays inward from the surface of a sphere targeted at the character mesh. The points in space at which the rays hit the external surface of the shape of the object define the 3D representation of the object. Thereby, a single closed form mesh can be created with a desired level of detail. The ray targeting technique is useful for resolving concavities in the mesh. Although the Visual. Hull and Ray Targeting Techniques are described above, any of a variety of techniques appropriate to a specific application can be utilized to form a 3D representation of a 3D character in accordance with embodiments of the invention.

Salient points can be areas of the mesh that are more complicated, such as where joints, feet or legs may cause important deformations of the mesh or where the extremities of the mesh are located. In many embodiments, the identification of salient points (304) on the mesh can be accomplished using techniques such as volumetric axis, Laplacian eigenmaps, isomaps, medial surface line, fitting the centroids of a set of spheres fitted inside the mesh, volumetric matching, and voxel reduction or voxel erosion techniques. For example, an implementation utilizing Laplacian eigenmaps allow for the non-rigged mesh to be pose invariant. In this way, salient points are identified unequivocally even if the non-rigged character mesh is in different poses. A number of embodiments identify optimal locations of the salient points from a training dataset. A training dataset may utilize Principle Component Analysis (PCA) for transformation and dimensionality reduction on the space of mesh silhouettes and the non-linear regression over the location of manually identified salient points. Various embodiments employ a user interface to provide feedback on the placement of the salient points. Thereby, a user is able to identify salient points in a mesh more suited to identification via a user interface than automatic generation. Examples of such meshes include, but are not limited to, a unique mesh where the user wishes to animate the mesh in ways that cannot be automatically generated or wishes to save processing resources.

In many embodiments, the skeleton structure can be identified (306) from the salient points. This may be done by using statistical information of how the joints are placed in a body given salient points such as the groin, top of the head or the armpits in a humanoid character. Intermediate joints are also placed, such as clavicles, mid-foot joints, etc. Intermediate joints are useful in the skinning of the mesh to provide realistic deformation of the mesh when animated. Automatic methods for identifying the number of fingers in the hands and to place the bones properly in the fingers can also be used. For example, an algorithm in certain embodiments finds the points on the mesh that have both a large geodesic distance from the wrist and a large geodesic distance from each other. Additionally, methods such as those utilized within the Pinocchio System described in Ilya Baran, Jovan Popović, *Automatic rigging and animation of 3D characters*, ACM Transactions on Graphics (TOG), v. 26 n. 3, July 2007, the disclosure of which is incorporated herein by reference in its entirety, can also be utilized to automatically perform a FK rigging of the closed form mesh. The skeleton embedding process of the Pinocchio System solves the problem of skeleton identification by constructing a graph whose vertices represent potential joint positions and whose edges are potential bone segments. The graph may be constructed by packing spheres centered on the approximate medial surface into the character and by connecting sphere centers with graph edges. Thereby, the centroids of a set of spheres inside a 3D representation are fitted to a graph. Optimal embedding of the skeleton into the graph with respect to a discrete penalty function may be used where the discrete solution is used as a starting point for continuous optimization. The penalty function penalizes undesirable embeddings and allows generalization to new characters. Thereby, the Pinnochio System fits a predefined skeleton to a closed form mesh. By fitting a predefined skeleton to a closed form mesh, a reference skeleton can be used on the predefined skeleton to animate the character using motion data defined relative to the reference skeleton. In several embodiments, the orientation of the bone local coordinate frames is defined to allow for an optimal ability to edit the animation curves once the joint centers are identified and the bones in-between the joint centers are placed. Typically, on a T-posed character the long axis of the bones in the arms would be along the global X axis and in the legs along the global Y axis.

In many embodiments, optimal skinning weights are calculated (308) to define the relationships between the motion of the mesh polygons and the underlying skeleton bones. A number of techniques appropriate to specific applications can be used to calculate optimal skinning weights including, but not limited to, diffusion, proximity maps and template matching. Calculation of optimal skinning weights allows for automatic or manual definition of parameters such as the maximum number of bones that can influence a given polygon motion, the fall off constants in the mesh transition areas from one bone to another, and local optimization parameters for specific areas such as the hands and the head where the profile of the skinning weight should be specific to the considered bone.

In one embodiment the skinning weights are calculated (308) using a heat diffusion method. For example, each body segment is modeled as a heat emitting body, one at a time, while the surrounding segments are considered as heat absorbing bodies. This formulation leads to a set of independent Poisson problems, one for each segment. Problem specific diffusion coefficients and Dirichlet-type boundary conditions are used to capture the peculiarity of each segment/joint diffusion problem. Such parameters can be automatically estimated, with different degrees of detail, using machine learning techniques applied on a training set of manually skinned models. This results in skinning templates that are specific for a given joint and represent the typical spatial distribution of the skinning weights on a mesh. The skinning templates are defined through this process undergoing supervised learning. Supervised learning may occur here where the process identifies aspects of the skinning template under user direction.

In many embodiments, both the skeleton and skinning weights are transferred (310) to the original non-rigged mesh or group of meshes once the skinning weights are calculated on the representation mesh. In certain embodiments of the invention, this process is performed using a mean value coordinate method. Also, various embodiments perform this process through a nearest neighbor search and local interpolation.

In the illustrated embodiment, a 3D representation is created for proper identification (306) of the skeleton by creating a single closed form mesh from a non-rigged mesh or group of non-rigged meshes that define the appearance of a 3D character. Additionally, certain processes allow for simplification of the non-rigged mesh for easier processing. Identification (306) of the skeleton is also facilitated through identification (304) of salient points. Once the skeleton is identified (306), optimal skinning weights are calculated (308) for the non-rigged mesh and identified skeleton. The calculated skinning weights and identified skeleton are transferred (310) to the original non-rigged mesh to create a 3D character with mesh that is rigged to a skeleton. Thereby, the detail of the original non-rigged mesh is preserved and can be animated using the skeleton and skinning weights. Furthermore, automatic rigging may be performed according to user preferences from user input. For example, a user may prefer that a character be animated with a unique skeleton or a unique skin, such as modeling an injury or a uniqueness to the character, that could be modeled by affecting the skeleton or the skinning weights in a way that may correspondingly affect character animation.

Characterization

Figure 4:
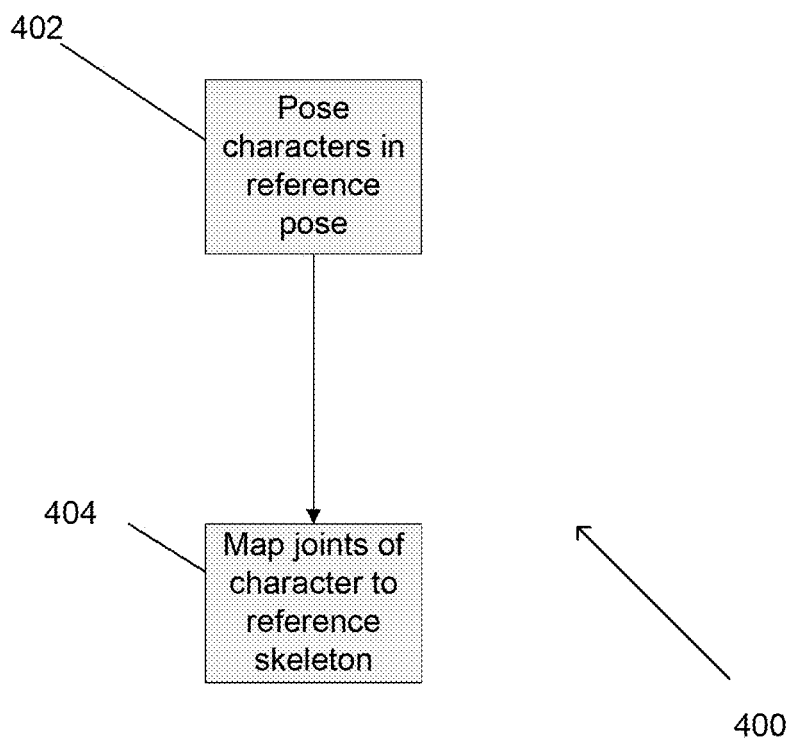
FIG. 4 is a flow chart illustrating a process of characterization in accordance with an embodiment of the invention.

FIG. 4 is a flow chart illustrating a process 400 of characterization in accordance with an embodiment of the invention. Characterization 400 begins by posing (402) the now rigged 3D character in a reference pose for animation. After posing the character, the joints of the character are mapped (404) to a reference skeleton. The posing and mapping operations can be performed where mapping occurs before posing in certain embodiments.

In many embodiments, the character is brought (402) to a reference pose that is consistent with the reference pose of the available motion data. The reference pose is for the purpose of retargeting the available motion data. For example, a reference pose may be a T-pose, defined as when the arms of the character are aligned side to side along the X axis and the legs are aligned vertically along the Y axis. After bringing (402) the character to a reference pose, the joints of the character are mapped (402) to a reference skeleton. Mapping allows for proper retargeting. For example in retargeting, motion data for the reference skeleton is used to animate the skeleton of the autorigged 3D character in such a way that the motion data is modified to accommodate variations in the skeleton hierarchy and/or bone length.

In the illustrated embodiment, once a character is posed (402) in a reference pose, the joints of the character may be mapped (404) using a reference skeleton. Thereby, retargeting and eventually animation of the character may then be achieved. In several embodiments, the animation occurs using synthetic motion data generated in response to a description of a desired motion using processes similar to the processes described in U.S. patent application Ser. No. 12/753,032, to de Aguilar et al. titled "Web Platform for Interactive Design, Synthesis and Delivery of 3D Character Motion Data", the disclosure of which is incorporated by reference herein in its entirety. In other embodiments, the 3D character can be animated using actual motion data or manually using motion data generated by an animator.

Illustration of Autorigging and Animation

Figure 5A:
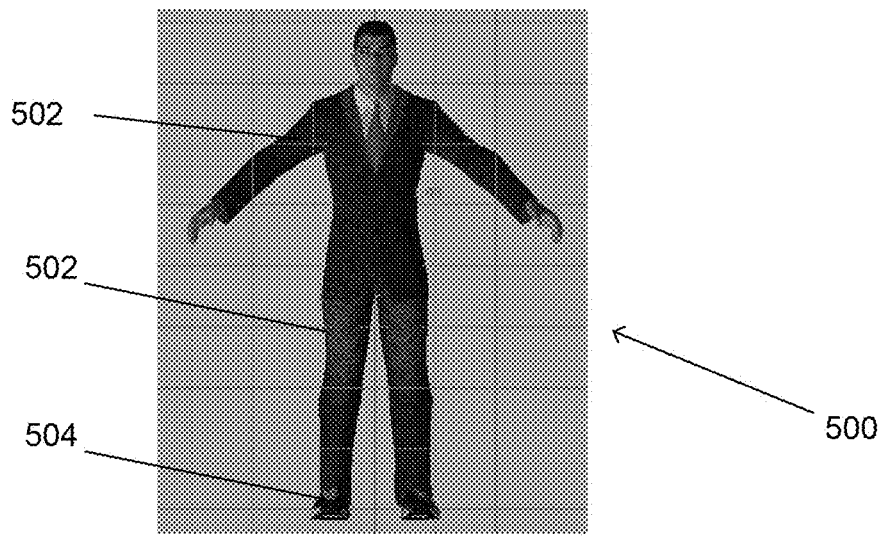
FIG. 5A is an illustration of a non-rigged 3D mesh in accordance with an embodiment of the invention.

FIG. 5A is an illustration of a non-rigged mesh defining the appearance of a 3D character in accordance with an embodiment of the invention. In the illustrated embodiment, the non-rigged mesh 500 that defines the appearance of a 3D character does not include an associated skeleton or skinning weights. Also, the mesh may be detailed such as providing features of clothing 502, shoes 504 or accessories, which may be provided from multiple meshes in various embodiments. Thereby, processes in accordance with embodiments of the invention function irrespective of the number of meshes so long as the meshes required for the character to be visualized and represented in an animation are provided.

Figure 5B:
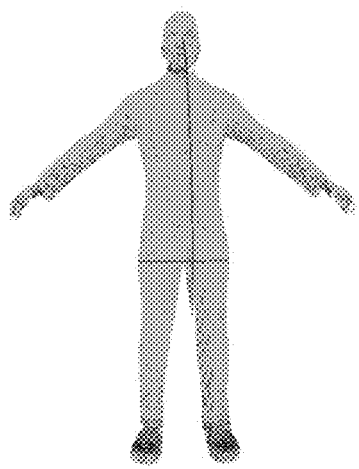
FIG. 5B is an illustration of 3D representation in accordance with an embodiment of the invention.

FIG. 5B is an illustration of a 3D representation of the non-rigged mesh 500 shown in FIG. 5A in accordance with an embodiment of the invention. In many embodiments, the 3D representation does not possess the level of detail of the original non-rigged mesh. Rather, the 3D representation merely contains a single closed form mesh that can fully represent the original non-rigged mesh as an enclosed surface. In the illustrated embodiment, detail of the specific clothing 502, shoes 504 or other features of the character shown in FIG. 5A are not present in the 3D representation of FIG. 5B.

Figure 5C:
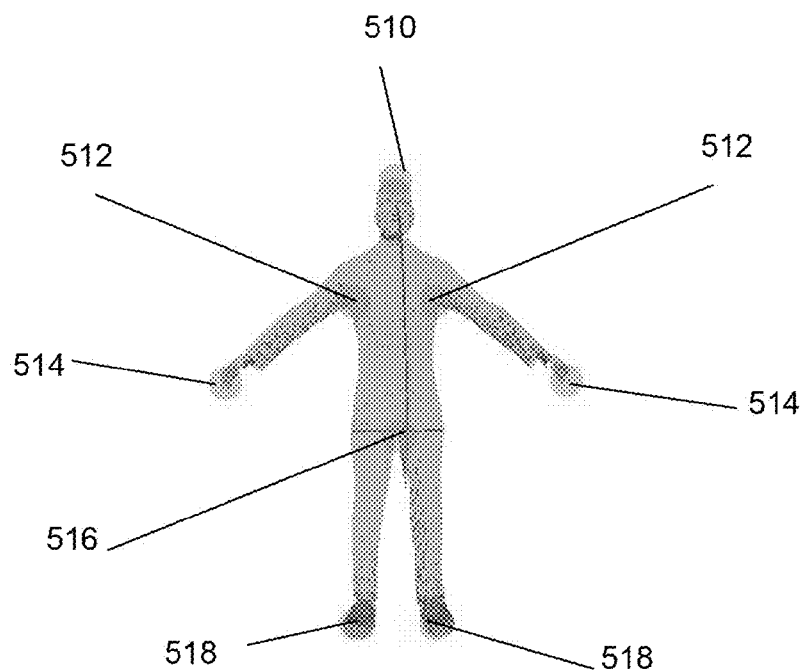
FIG. 5C conceptually illustrates the determination of salient points in accordance with an embodiment of the invention.

FIG. 5C is an illustration of salient points on the 3D representation shown in FIG. 5B in accordance with an embodiment of the invention. In many embodiments, the salient points are identified manually or automatically. In the illustrated embodiment, the salient points are identified as the top of the head 510, the armpits 512, fingers 514, groin 516 and feet 518. Although specific salient points are illustrated in FIG. 5C, any of a variety of salient points can be defined as appropriate to specific applications in accordance with embodiments of the invention.

Figure 5D:
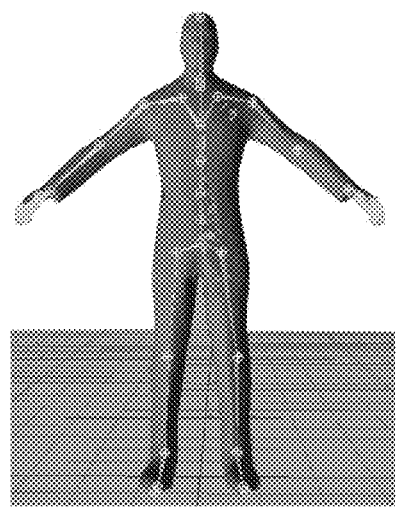
FIG. 5D conceptually illustrates skeleton identification in accordance with an embodiment of the invention.

FIG. 5D is an illustration of skeleton identification for the 3D representation shown in FIG. 5C in accordance with an embodiment of the invention. In many embodiments, an algorithm utilizing identification of salient points may be used to identify a skeleton embedded within the 3D representation. In the illustrated embodiment, various essential joints are identified within the 3D representation to constitute the skeleton.

Figure 5E:
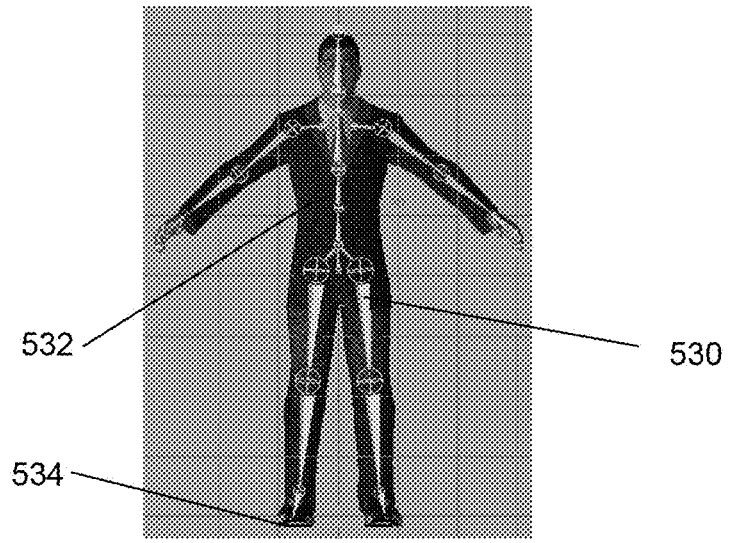
FIG. 5E is an illustration of an automatically rigged mesh in accordance with an embodiment of the invention.

FIG. 5E is an illustration of an automatically rigged mesh in accordance with an embodiment of the invention. The original non-rigged mesh of FIG. 5A is shown rigged with a skeleton 530 and skinning weights in FIG. 5E. In embodiments of the invention, the skinning weights and skeleton 530 derived from the 3D representation of FIG. 5B are transferred to the original non-rigged mesh of FIG. 5A. Thereby, the original non-rigged mesh is automatically rigged, preserving the detail of the original non-rigged mesh (i.e. the clothes 532, shoes 534 and other features of the original non-rigged mesh). In the illustrated embodiment, the mesh of FIG. 5A 500 is rigged with the skeleton 530 of FIG. 5D, derived from the 3D representation of FIG. 5B.

Figure 5F:
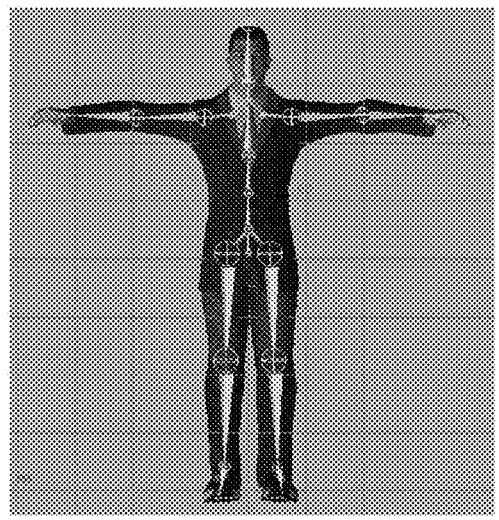
FIG. 5F is an illustration of a reference pose in accordance with an embodiment of the invention.

FIG. 5F is an illustration of a reference pose in accordance with an embodiment of the invention. In various embodiments, a reference pose is utilized for mapping and retargeting. The autorigged character can be put in a reference pose automatically or with minimal user input.

Figure 5G:
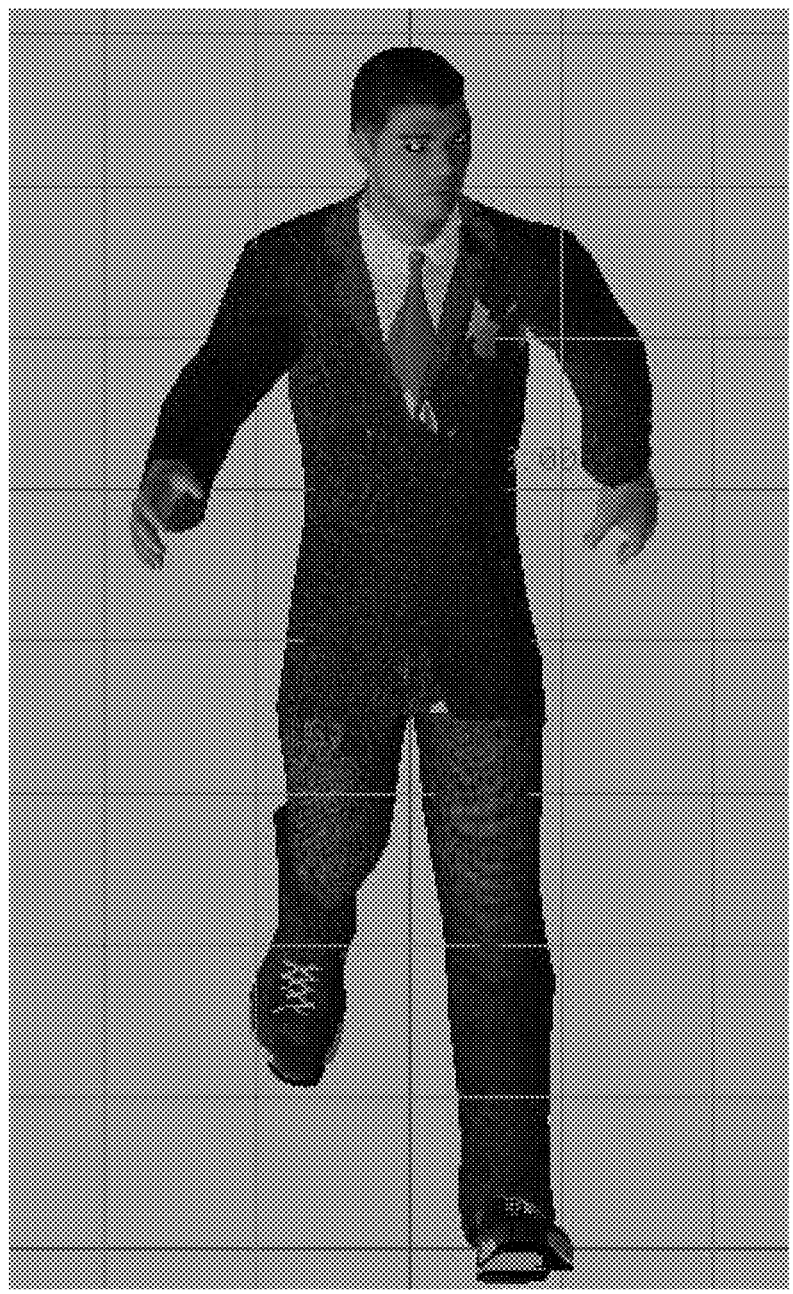
FIG. 5G is an illustration of an animated character from the non-rigged 3D mesh of FIG. 5A in accordance with an embodiment of the invention.

FIG. 5G is an illustration of an animated 3D character generated using the non-rigged 3D mesh of FIG. 5A in accordance with an embodiment of the invention. The animation is generated by retargeting motion data from a selected animation to the autorigged 3D character. In the illustrated embodiment, the 3D character is animated using synthetic motion data generated using a high level description of a desired motion.

Automated Online Process

Figure 6:
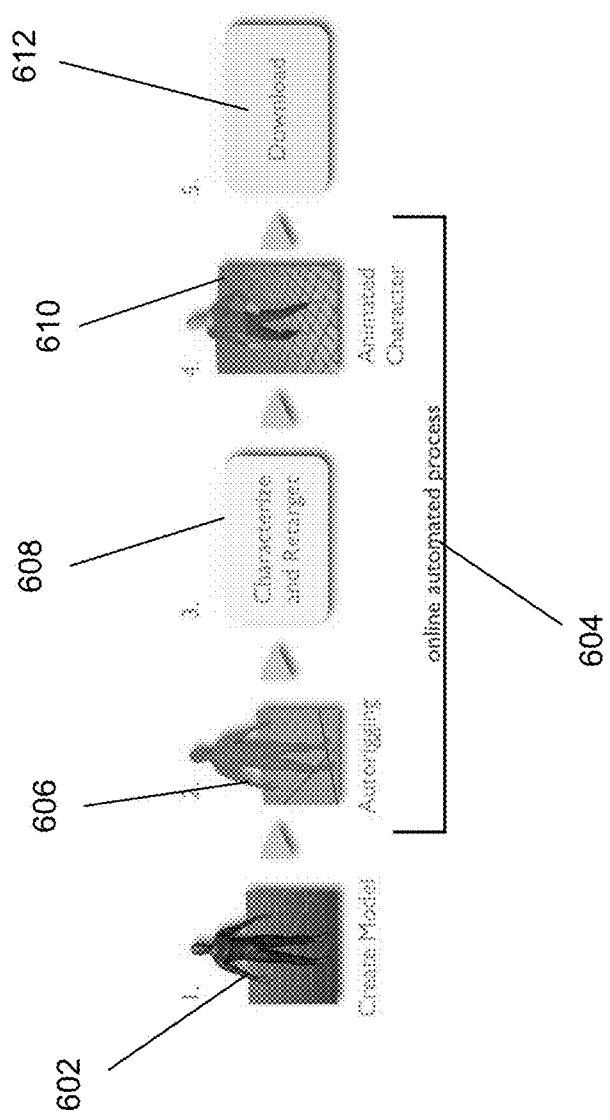
FIG. 6 is an illustration of a process for animating a non-rigged 3D character online in accordance with an embodiment of the invention.

FIG. 6 is an illustration of a process for animating a non-rigged 3D character online in accordance with an embodiment of the invention. This process begins with the creation (602) of a mesh or meshes that define the appearance of a 3D character. The meshes can be non-rigged or can be part of a rigged 3D character. Then the online automated process 604 spans a process of forward kinematic autorigging (606), then characterization and retargeting (608) and animation (610) of the character. Lastly the animated character is downloaded (612).

In many embodiments, the non-rigged mesh undergoes autorigging (606). The autorigging process may be similar to the autorigging process described herein. Autorigging typically generates a skeleton along with skinning weights associating the skeleton with mesh. Characterization and retargeting (608) may entail bringing the autorigged character into a reference pose, mapping the joints of the character to a reference skeleton and retargeting motion data defined relative to the reference skeleton. The retargeted motion data applied to the skeleton can then animate (610) the 3D character. Upon the conclusion of the online automated process, the animated (610) character can be downloaded (612) or undergo further processing.

In the illustrated embodiment, a user provides (602) a non-rigged mesh. The mesh may be associated with a user created model or other model. The user may then utilize a user device to undergo an online automated process 604 of autorigging (606), characterization, retargeting (608) and animating (610) the character. The autorigging (606) may be performed locally but with an eye for characterization and retargeting (608) in animating (610) the character from motion data available online. The motion data may be generated from a database of motion data. The user may then download the character once the online automated process is concluded.

Although the present invention is described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive. Furthermore, all references, such as patents, publications, documentation or other disclosures, herein disclosed are now expressly incorporated by reference.

What is claimed is:

1. A method of automatically rigging at least one mesh defining the external appearance of a 3D character, comprising:

receiving at least one non-rigged 3D mesh of an external appearance of a 3D character from a user device over a network using a server system;

creating a 3D representation of the external appearance of the 3D character defined by the at least one non-rigged mesh received from the user device over the network using the server system, where the 3D representation is a single closed form mesh;

identifying salient points of the 3D representation using the server system;

fitting a reference skeleton to the 3D representation based upon the identified salient points using the server system;

calculating skinning weights for the 3D representation based upon the fitted skeleton using the server system; and automatically rigging the 3D character by transferring the skeleton and skinning weights generated with respect to the 3D representation to the at least one non-rigged mesh defining the external appearance of the 3D character to form a rigged mesh of the 3D character using the server system.

2. The method of claim 1, wherein creating a 3D representation of the external appearance of the 3D character defined by the at least one non-rigged mesh comprises building the 3D representation from a plurality of 2D silhouettes of the at least one non-rigged mesh taken from different viewpoints using the server system.

3. The method of claim 1, wherein creating a 3D representation of the external appearance of the 3D character defined by the at least one mesh comprises building the 3D representation using ray.

4. The method of claim 1, wherein identifying salient points of the 3D representation is performed using at least one technique selected from the group consisting of:
volumetric axis;
laplacian eigenmaps;
isomaps;
medial surface line;
fitting the centroids of a set of spheres fitted inside the mesh;
volumetric matching;
voxel reduction; and
voxel erosion.

5. The method of claim 1, wherein identifying salient points of the 3D representation is performed utilizing a training dataset.

6. The method of claim 5, wherein identifying salient points of the 3D representation comprises identifying salient points of the 3D representation using Principle Component Analysis of the training dataset.

7. The method of claim 1, wherein identifying salient points of the 3D representation is performed using data manually input that is received by the server system.

8. The method of claim 1, wherein fitting a reference skeleton to the 3D representation utilizes the identified salient points.

9. The method of claim 1, wherein fitting a reference skeleton to the 3D representation comprises fitting the centroids of a set of spheres inside the 3D representation to a graph.

10. The method of claim 1, wherein calculating skinning weights for the 3D representation based upon the fitted skeleton involves using skinning templates specific to each joint.

11. A method of animating a 3D character, comprising:
receiving at least one non-rigged mesh defining an external appearance of a 3D character from a user device over a network using a server system;

automatically rigging at least one non-rigged mesh defining the external appearance of a 3D character using the server system to form a rigged mesh of the 3D character, where automatically rigging the at least one non-rigged mesh comprises fitting a skeleton to the at least one non-rigged mesh and defining skinning weights for the at least one non-rigged mesh based upon the fitted skeleton;

characterizing the fitted skeleton of the rigged mesh with respect to a reference skeleton using the server system;

retargeting motion data defined with respect to the reference skeleton to the fitted skeleton of the 3D character using the server system; and animating the 3D character by driving the rigged mesh in accordance with the fitted skeleton, the skinning weights, and the retargeted motion data using the server system, wherein automatically rigging at least one non-rigged mesh defining the external appearance of a 3D character to form the rigged mesh further comprises:
creating a 3D representation of the external appearance of the 3D character defined by the at least one non-rigged mesh using the server system, where the 3D representation is a single closed form mesh;
identifying salient points of the 3D representation using the server system;
fitting a reference skeleton to the 3D representation using the server system;
calculating skinning weights for the 3D representation based upon the fitted skeleton using the server system; and
transferring the skeleton and skinning weights to the at least one non-rigged mesh defining the external appearance of the 3D character to form the rigged mesh using the server system.

12. The method of claim 11, wherein the motion data that is retargeted is actual motion data.

13. The method of claim 11, further comprising:
generating synthetic motion data with respect to the reference skeleton using the server system wherein the synthetic motion is generated based upon a high level description of a motion;
wherein the motion data defined with respect to the reference skeleton to the fitted skeleton that is retargeted to the 3D character is the synthetic motion data.

14. An animation system, comprising:
a server system configured to receive at least one non-rigged mesh defining the external appearance of a 3D character and a high level description of a motion from a user device over a network;
wherein the server system is further configured to automatically rig the at least one non-rigged mesh to form a rigged mesh by fitting a reference skeleton to the at least one non-rigged mesh and defining skinning weights for the at least one non-rigged mesh based upon the fitted skeleton;
wherein the server system is further configured to generate synthetic motion data for the reference skeleton based upon the high level description of the motion; and
wherein the server system is further configured to retarget the synthetic motion data to the skeleton of the 3D character;
wherein the server system is further configured to automatically rig the at least one non-rigged mesh to form a rigged mesh by fitting a reference skeleton to the at least one non-rigged mesh and defining skinning weights for the at least one non-rigged mesh based upon the fitted skeleton by:
  creating a 3D representation of the external appearance of the 3D character defined by the at least one non-rigged mesh, where the 3D representation is a single closed form mesh;
  identifying salient points of the 3D representation;
  fitting a reference skeleton to the 3D representation;
  calculating skinning weights for the 3D representation based upon the fitted skeleton; and
  automatically rigging the 3D character by transferring the skeleton and skinning weights to the at least one mesh defining the external appearance of the 3D character.

15. A method of animating a 3D character, comprising:
receiving at least one non-rigged mesh defining an external appearance of a 3D character from a user device over a network in a server system;
automatically rigging the at least one non-rigged mesh defining the external appearance of a 3D character to form a rigged mesh using the server system, where automatically rigging the at least one non-rigged mesh comprises:
  creating a 3D representation of the external appearance of the 3D character defined by the at least one non-rigged mesh using the server system, where the 3D representation is a single closed form mesh;
  identifying salient points of the 3D representation using the server system;
  fitting a reference skeleton to the 3D representation using the server system;
  calculating skinning weights for the 3D representation based upon the fitted skeleton using the server system; and
transferring the skeleton and skinning weights to the at least one mesh defining the external appearance of the 3D character using the server system;
characterizing the fitted skeleton with respect to a reference skeleton using the server system;
generating synthetic motion data with respect to the reference skeleton based upon a high level description of a motion using the server system;
retargeting the synthetic motion data defined with respect to the reference skeleton to the fitted skeleton of the 3D character using the server system; and
animating the 3D character using the server system by driving the at least one mesh in accordance with the fitted skeleton, the skinning weights, and the retargeted motion data.

* * * * *